US009203858B2

(12) United States Patent
Shankar et al.

(10) Patent No.: US 9,203,858 B2
(45) Date of Patent: Dec. 1, 2015

(54) METHOD AND SYSTEM FOR GENERATING AN ADVISORY MESSAGE FOR AN ENDPOINT DEVICE

(75) Inventors: Rohit Shankar, Hyderabad (IN); Sumit B. Deshpande, Central Islip, NY (US); Ravi R. Pore, Manarashtra (IN); Srinivas Gudipudi, Hyderabad (IN); Abhilash V. Purushothaman, Kerala (IN); Yidong Zhu, Lincolnshire, IL (US); Theodore Short, Jacksonville, FL (US)

(73) Assignee: CA, Inc., New York, NY (US)

( * ) Notice: Subject to any disclaimer, the term of this patent is extended or adjusted under 35 U.S.C. 154(b) by 2932 days.

(21) Appl. No.: 11/466,282

(22) Filed: Aug. 22, 2006

(65) Prior Publication Data
US 2007/0113080 A1    May 17, 2007

Related U.S. Application Data

(60) Provisional application No. 60/735,690, filed on Nov. 11, 2005.

(51) Int. Cl.
  *H04W 4/00*   (2009.01)
  *H04L 29/06*  (2006.01)
  *H04W 12/12*  (2009.01)

(52) U.S. Cl.
  CPC .......... *H04L 63/1433* (2013.01); *H04W 12/12* (2013.01)

(58) Field of Classification Search
  None
  See application file for complete search history.

(56) References Cited

U.S. PATENT DOCUMENTS

| | | | |
|---|---|---|---|
| 6,281,790 B1 | 8/2001 | Kimmel et al. | |
| 6,704,874 B1 * | 3/2004 | Porras et al. | 726/22 |
| 6,970,917 B1 | 11/2005 | Kushwaha et al. | |
| 6,972,676 B1 | 12/2005 | Kimmel et al. | |
| 7,042,867 B2 | 5/2006 | Whitehill et al. | |
| 7,546,357 B2 * | 6/2009 | Manchester et al. | 709/220 |
| 7,804,808 B2 * | 9/2010 | Bhagwat et al. | 370/338 |
| 2002/0112046 A1 | 8/2002 | Kushwaha et al. | |
| 2003/0056116 A1 | 3/2003 | Bunker, V et al. | 713/201 |
| 2004/0028017 A1 | 2/2004 | Whitehill et al. | |
| 2004/0048613 A1 | 3/2004 | Sayers et al. | |
| 2004/0098610 A1 | 5/2004 | Hrastar | 713/200 |
| 2005/0008001 A1 | 1/2005 | Williams et al. | 370/352 |
| 2005/0010821 A1 | 1/2005 | Cooper et al. | 713/201 |
| 2005/0206513 A1 | 9/2005 | Fallon | |
| 2006/0142013 A1 | 6/2006 | Sayers et al. | |
| 2006/0153075 A1 | 7/2006 | Whitehill et al. | |
| 2006/0203736 A1 * | 9/2006 | Molen et al. | 370/245 |
| 2007/0117593 A1 * | 5/2007 | Izdepski | 455/565 |
| 2009/0175447 A1 * | 7/2009 | Adachi et al. | 380/270 |

OTHER PUBLICATIONS

PCT Notification of Transmittal of the International Search Report with attached PCT International Search Report and Written Opinion of the International Searching Authority in International Application No. PCT/US2006/043381 filed Nov. 7, 2006 (12 pages), Mailed Mar. 14, 2007.

* cited by examiner

*Primary Examiner* — Willie J Daniel, Jr.
(74) *Attorney, Agent, or Firm* — Baker Botts L.L.P.

(57) ABSTRACT

According to one embodiment of the invention, a method for generating an advisory message for an endpoint device includes determining a threat level for the endpoint device by identifying a connection type between the endpoint device and the wireless network. The method also includes determining a second threat level for the endpoint device by identifying a security policy of the endpoint device. The method further includes generating an advisory message for the endpoint device based on the threat levels. The advisory message indicates vulnerability of the endpoint device.

18 Claims, 2 Drawing Sheets

METHOD AND SYSTEM FOR GENERATING AN ADVISORY MESSAGE FOR AN ENDPOINT DEVICE

CROSS REFERENCE TO RELATED APPLICATIONS

This application claims the benefit of priority under 35 U.S.C. §119(e) of U.S. Provisional Patent Application Ser. No. 60/735,690 entitled "Secure and Manageable Wireless Computing Systems and Methods," which was filed on Nov. 11, 2005.

TECHNICAL FIELD OF THE INVENTION

This invention relates generally to wireless networks, and more particularly, to a method and system for generating an advisory message for an endpoint device.

BACKGROUND OF THE INVENTION

Recently, various wireless network technologies have emerged to enable portable endpoint devices (such as laptops, personal digital assistants, cellular telephones, etc.) to communicate both with each other and with wireless networking environments. However, wireless networks are inherently less secure than wired networks, because wired networks may be at least partially located inside a building that can be protected from unauthorized access. Wireless networks do not have the same physical protection and therefore are more vulnerable to attacks. An attacker may use a number of strategies to exploit this vulnerability to pierce network security, corrupt network communications, infiltrate network participants, or compromise routing of network traffic. Accordingly, it is generally desirable to provide an effective security mechanism in wireless networks.

OVERVIEW OF EXAMPLE EMBODIMENTS

According to one embodiment of the invention, a method for generating an advisory message for an endpoint device includes determining a threat level for the endpoint device by identifying a connection type between the endpoint device and a wireless network. The method also includes determining another threat level for the endpoint device by identifying a security policy of the endpoint device. The method further includes generating an advisory message for the endpoint device based on the threat levels. The advisory message indicates vulnerability of the endpoint device.

Technical advantages of particular embodiments of the present invention include a method and system for generating an advisory message for an endpoint device that alerts a user of the vulnerability of the endpoint device. Thus, a user can take measures to prevent an unauthorized connection from being established.

Another technical advantage of particular embodiments of the present invention includes a method and system for generating an advisory message for an endpoint device that updates the advisory message using a security policy-driven mechanism. Accordingly, changes to the security policy may update the advisory message in approximately real-time, giving a user an updated vulnerability assessment.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

Figure 1:
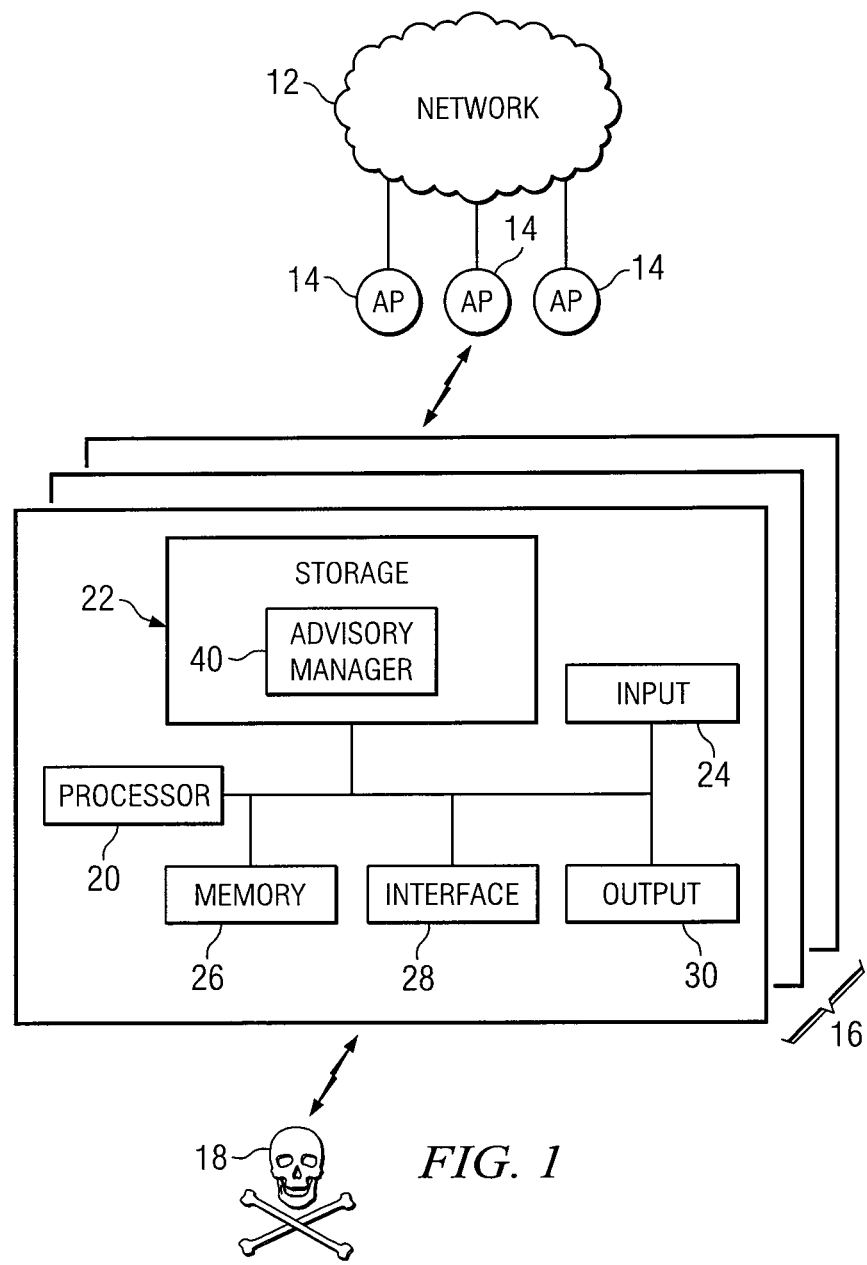
FIG. 1 illustrates a system that incorporates aspects of the present invention.
Figure 2:
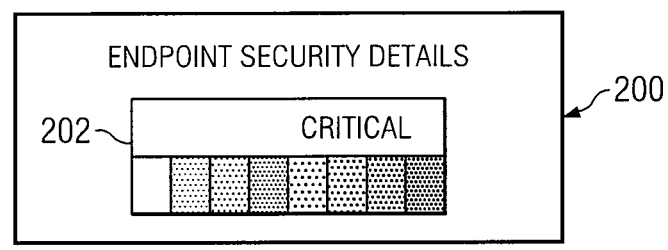
FIG. 2 is a simplified diagram of an example advisory message for an endpoint device.
Figure 3:
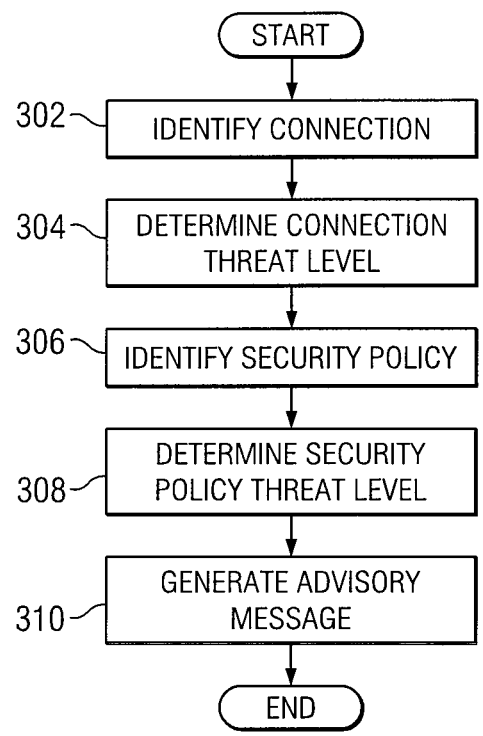
FIG. 3 is a flow diagram for generating an advisory message for an endpoint device.

Embodiments of the present invention and its advantages are best understood by referring to FIGS. 1 through 3 of the drawings, like numerals being used for like and corresponding parts of the various drawings.

FIG. 1 illustrates one embodiment of a system 10 for generating an advisory message for an endpoint device according to the teachings of the present invention. As shown in FIG. 1, system 10 generally includes a network 12, one or more wireless access points 14, and one or more endpoint devices 16. System 10 is particularly adapted for alerting a user of endpoint device 16 of the vulnerability of endpoint device 16.

Network 12 may refer to any interconnecting system capable of transmitting audio, video, signals, data, messages, or any combination of the preceding. Network 12 may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

Network 12 may transmit information in packet flows, in one embodiment. A packet flow includes one or more packets sent from a source to a destination. A packet may comprise a bundle of data organized in a specific way for transmission, and a frame may comprise the payload of one or more packets organized in a specific way for transmission. A packet-based communication protocol such as Internet Protocol (IP) may be used to communicate the packet flows.

A packet flow may be identified in any suitable manner. As an example, a packet flow may be identified by a packet identifier giving the source and destination of the packet flow. A source may be given by an address such as the IP address, port, or both. Similarly, a destination may be given by an address such as the IP address, port, or both.

Network 12 may utilize protocols and technologies to transmit information. Example protocols and technologies include those described by the Institute of Electrical and Electronics Engineers, Inc. (IEEE) 802.xx standards such as 802.11, 802.16, or WiMAX standards, the International Telecommunications Union (ITU-T) standards, the European Telecommunications Standards Institute (ETSI) standards, Internet Engineering Task Force (IETF) standards, the third generation partnerships project (3GPP) standards, or other standards.

Access point 14 may be any network point suitable to couple a wireless device, such as endpoint device 16, to a network, such as network 12. According to one embodiment of the invention, access point 14 may have a wired connection to network 12. According to another embodiment of the invention, access point 14 may have a wireless connection to network 12. According to another embodiment of the invention, access point 14 may include a receiver or transmitter or both a receiver and a transmitter. As an example, access point 14 may include an omni-directional antenna operable to communicate with one or more endpoints.

In particular embodiments of the invention, communications between access point 14 and endpoint device 16 are communicated according to one or more secure wireless communication protocols or WLAN protocols, such as portions or all of the Wired Equivalent Privacy (WEP) protocol, the Robust Security Network (RSN) associated with the IEEE 802.11i protocol, the IEEE 802.1x protocol, the Advanced Encryption Standard (AES), the Temporal Key Integrity Protocol (TKIP), Extensible Authentication Protocol over LAN (EAPOL) algorithms or protocols (such as EAP-TTLS, PEAP, or CISCO's LEAP or EAP-FAST protocols, for example), WiFi Protected Access (WPA) protocol, WiFi Protected Access Pre-shared key (WPA-PSK) protocol, WiFi Protected Access Version 2 (WPA2) protocol, or WiFi Protected Access Version 2 Pre-shared key (WPA2-PSK) protocol, for example.

Endpoint device 16 may refer to any suitable device operable to communicate with network 12 through access point 14. In general, a device may include any suitable arrangement of components operable to perform the operations of the device, and may comprise logic. Logic may refer to hardware, software, other logic, or any suitable combination of the preceding. Endpoint device 16 may execute with any of the well-known MS-DOS, PC-DOS, OS-2, MAC-OS, WINDOWS™, UNIX, or other appropriate operating systems, including future operating systems. Endpoint device 16 may include, for example, a personal digital assistant, a computer such as a laptop, a cellular telephone, a mobile handset, or any other device operable to communicate with network 12 through access point 14.

In various embodiments of the invention, an attacker 18 may attempt to gain access to system 10. Attacker 18 may attempt to gain unauthorized access to pierce network security, corrupt network communications, infiltrate network participants, or compromise routing of network traffic. For example, if access point 14 is not password protected, it may be relatively easy for attacker 18 to gain access to network 12 through access point 14. As another example, attacker 18 may attempt to detect, or "sniff," security information, such as password information, from wireless signals being communicated between endpoint device 16 and access point 14. Attacker 18 may use these, or other similar methods, in order to gain unauthorized connections to endpoint device 16.

According to one embodiment of the invention, a system and method are provided that alert a user of an endpoint device of the vulnerability of the endpoint device. Thus, a user can take measures to prevent an unauthorized connection from being established. This is effected by determining various threat levels at the endpoint device such as a security policy threat level and a connection type threat level and communicating that information to a user. Additional details of example embodiments of the invention are described in greater detail below in conjunction with portions of FIG. 1, FIG. 2, and FIG. 3.

According to the illustrated embodiment of the invention, endpoint device 16 includes a processor 20, a storage device 22, an input device 24, a memory device 26, a communication interface 28, an output device 30, and an advisory manager 40.

Processor 20 may refer to any suitable device operable to execute instructions and manipulate data to perform operations for endpoint device 16. Processor 22 may include, for example, any type of central processing unit (CPU).

Storage device 22 may refer to any suitable device operable for storing data and instructions. Storage device 22 may include, for example, a magnetic disk, flash memory, or optical disk, or other suitable data storage device.

Input device 24 may refer to any suitable device operable to input, select, and/or manipulate various data and information. Input device 24 may include, for example, a keyboard, mouse, graphics tablet, joystick, light pen, microphone, scanner, or other suitable input device.

Memory device 26 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Communication interface 28 may refer to any suitable device operable to receive input for endpoint device 16, send output from endpoint device 16, perform suitable processing of the input or output or both, communicate to other devices, or any combination of the preceding. Communication interface 28 may include appropriate hardware (e.g. modem, network interface card, etc.) and software, including protocol conversion and data processing capabilities, to communicate through a LAN, WAN, or other communication system that allows endpoint device 16 to communicate to other devices. Communication interface 28 may include one or more ports, conversion software, or both.

Output device 30 may refer to any suitable device operable for displaying information to a user. Output device 30 may include, for example, a video display, a printer, a plotter, or other suitable output device.

Advisory manager 40 may refer to any suitable logic embodied in computer-readable media, and when executed operable to generate an advisory message that indicates vulnerability of endpoint device 16. In the illustrated embodiment of the invention, advisory manager 40 resides in storage device 22. In other embodiments of the invention, advisory manager 40 may reside in memory device 26, or any other suitable device operable to store and facilitate retrieval of data and instructions.

According to one embodiment of the invention, various criteria are considered by advisory manager 40 in generating an advisory message. The various criteria may include, but are not limited to, whether encryption is being used at endpoint device 16 and a connection type between endpoint device 16 and access point 14. For example, Table 1 describes such connection types between endpoint device 16 and access point 14, as well as a corresponding threat level that indicates vulnerability of the connection type.

TABLE 1

Sample Connection Type Data

| Connection Type | Connection Threat Level |
|---|---|
| Open/Share without 802.1x | High |
| Open/Share with 802.1x | Medium |
| WPA/WPA-PSK/WPA2/WPA2-PSK | Low |

According to another embodiment of the invention, other criteria may also be used such as a security policy enforced at endpoint device 16. A security policy may include a variety of states at endpoint device 16. For example, one state may be whether internet sharing is allowed at endpoint device 16. Internet sharing may include any act of one endpoint device allowing others to connect to the endpoint device using an internet browser. Another state may be whether network file sharing is allowed at endpoint device 16. Network file sharing may include any act of making files on one endpoint device accessible to others on a network. Yet another state may be whether dual homing is allowed at endpoint device 16. Dual homing may include any act of connecting an endpoint device to a network in which there is a primary connection and a secondary connection. Still another state may be whether ad-hoc connections are allowed at endpoint device 16. Ad-hoc connections may include any connection where endpoint devices communicate directly with one another rather than through an access point. For example, Table 2 describes such states, as well as a corresponding security policy based on the variety of states.

TABLE 2

Sample State Data

|  | Security Policy | | |
|---|---|---|---|
| State | High Security | Medium Security | Low Security |
| Network File Sharing | Disabled | Enabled | Enabled |
| Dual Homing | Disabled | Disabled | Enabled |
| Internet Sharing | Disabled | Disabled | Enabled |
| Ad-hoc Connectivity | Disabled | Disabled | Enabled |

According to one embodiment of the invention, each security policy may have a corresponding threat level. Table 3 lists such security policies, as well as a corresponding threat level based on the security policy.

TABLE 3

Sample Security Policy Data

| Security Policy | Security Policy Threat Level |
|---|---|
| High Security | Low |
| Medium Security | Medium |
| Low Security | High |

According to another embodiment of the invention, the threat levels of various factors may be used in determining a an advisory message that indicates vulnerability of endpoint device 16. The various advisory messages for endpoint device 16 may include, but are not limited to, "Critical," "Warning," and "Low." For example, if advisory manager 40 determined a connection threat level of "Medium," and a security policy threat level of "Medium," advisory manager 40 may generate a "Warning" advisory message for endpoint device 16. As another example, if advisory manager 40 determined a connection threat level of "High," and a security policy threat level of "High," advisory manager 40 may generate a "Critical" advisory message for endpoint device 16. As another example, if advisory manager 40 determined a connection threat level of "Low," and a security policy threat level of "Low," advisory manager 40 may generate a "Normal" advisory message for endpoint device 16. For example, Table 4 describes such threat levels using the connection and security policy threat levels.

TABLE 4

Sample Threat Level Data

| Connection Threat Level | Security Policy Threat Level | | |
|---|---|---|---|
|  | High | Medium | Low |
| High | Critical | Critical | Critical |
| Medium | Critical | Warning | Warning |
| Low | Critical | Warning | Normal |

FIG. 2 is a simplified diagram 200 of an example advisory message 202 for an endpoint device 16. Advisory message 202 reflects a "Critical" level of vulnerability for endpoint device 16. Advisory message 202 may be displayed using, for example, a window in a graphical application, a pop-up window, a dialog box, or any other suitable visual area operable to inform a user of vulnerability so that the user may take measures to secure endpoint device 16, and prevent an unauthorized connection from being established. Additionally, the present disclosure contemplates many types of levels to represent vulnerability of an endpoint device 16. Various embodiments may include some, all, or none of the enumerated levels.

FIG. 3 is a flow diagram illustrating example acts associated with generating an advisory message for an endpoint device. At step 302, a connection type of an endpoint device is identified by the advisory message system. In particular embodiments of the invention, the connection type may depend on whether encryption is being used, and the strength of the encryption used at the endpoint device. For example, if encryption is not used at the endpoint device, the connection type may be Open without 802.1x. As another example, if encryption is used at the endpoint device, the connection type may be WPA.

At step 304, a connection threat level is determined by the wireless network managing system. In particular embodiments of the invention, the connection threat level indicates vulnerability of the connection type identified in step 302. The connection threat level may range from "High," to "Medium," to "Low," or other similar measurements. The connection threat level is determined by the security of the connection type. For example, if the connection type is Open without 802.1x, the connection threat level may be "High." As another example, if the connection type is WPA, the connection threat level may be "Low."

At step 306, a security policy of the endpoint device is identified by the advisory message system. In particular embodiments of the invention, the security policy may include a variety of states at an endpoint device. The settings of the various states may indicate a level of protection of the endpoint device. For example, one state may be whether ad-hoc connections are allowed at the endpoint device. If ad-hoc connections are allowed at the endpoint device, the security policy may be a "Low Security" policy, indicating that the endpoint device is not well-protected. Alternatively, if ad-hoc connections are prevented at the endpoint device, the security policy may be a "High Security" policy, indicating that the endpoint device is highly protected.

At step 308, a security policy threat level is determined by the wireless network managing system. In particular embodiments of the invention, the security policy threat level indicates vulnerability of the security policy identified in step 306. The security policy threat level may range from "High," to "Medium," to "Low," or other similar measurements. For example, if the security policy is a "Low Security" policy, the security policy threat level may be "High." As another example, if the security policy is a "High Security" policy, the security policy threat level may be "Low."

At step 310, an advisory message is generated by the advisory message system. In particular embodiments of the invention, the advisory message is generated based on the connection threat level and the security policy threat level. The advisory message indicates vulnerability of the endpoint device. For example, if the advisory message is "Critical," the endpoint device may be highly vulnerable to attacks. As another example, if the advisory message is "Normal," the endpoint device may be operating at a standard level of vulnerability.

In particular embodiments of the invention, the advisory message may be displayed to a user of the endpoint device so the user can take measures to prevent an unauthorized connection from being established. For example, an advisory message of "Critical" may alert a user that the endpoint device is highly vulnerable to attacks. Thus, the user may change the either the security policy or the connection type of the endpoint device to provide a higher level of protection and avoid attacks.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method for generating an advisory message for an endpoint device in a wireless network, comprising:
    determining, by a processor, a first threat level for an endpoint device in the wireless network by identifying a connection type between the endpoint device and the wireless network;
    determining, by the processor, a second threat level for the endpoint device by identifying a security policy of the endpoint device; and
    based on the first threat level and the second threat level, generating an advisory message for the endpoint device that indicates vulnerability of the endpoint device.

2. The method of claim 1, wherein the security policy comprises a plurality of states of the endpoint device.

3. The method of claim 2, wherein the plurality of states comprises a state indicative of whether the endpoint device allows dual homing.

4. The method of claim 2, wherein the plurality of states comprises a state indicative of whether the endpoint device allows internet sharing.

5. The method of claim 2, wherein the plurality of states comprises a state indicative of whether the endpoint device allows network file sharing.

6. The method of claim 2, wherein the plurality of states comprises a state indicative of whether the endpoint device allows ad-hoc connections.

7. A system for generating an advisory message, comprising:
    a wireless network, the wireless network comprising one or more access points; and
    an endpoint device operable to connect to the wireless network, the endpoint device comprising:
        a processor; and
        a storage device, readable by the endpoint device, embodying a program of instructions executable by the processor to perform steps for generating an advisory message, the steps comprising:
        determining a first threat level for the endpoint device in the wireless network by identifying a connection type between the endpoint device and the wireless network;
        determining a second threat level for the endpoint device by identifying a security policy of the endpoint device; and
        based on the first threat level and the second threat level, generating an advisory message for the endpoint device that indicates vulnerability of the endpoint device.

8. The system of claim 7, wherein the security policy comprises a plurality of states of the endpoint device.

9. The system of claim 8, wherein the plurality of states comprises a state indicative of whether the endpoint device allows dual homing.

10. The system of claim 8, wherein the plurality of states comprises a state indicative of whether the endpoint device allows internet sharing.

11. The system of claim 8, wherein the plurality of states comprises a state indicative of whether the endpoint device allows network file sharing.

12. The system of claim 8, wherein the plurality of states comprises a state indicative of whether the endpoint device allows ad-hoc connections.

13. Logic encoded in non-transitory computer-readable media, the logic being operable to:
    determine a first threat level for an endpoint device in a wireless network by identifying a connection type between the endpoint device and the wireless network;
    determine a second threat level for the endpoint device by identifying a security policy of the endpoint device; and
    based on the first threat level and the second threat level, generate an advisory message for the endpoint device that indicates vulnerability of the endpoint device.

14. The logic of claim 13, wherein the security policy comprises a plurality of states of the endpoint device.

15. The logic of claim 14, wherein the plurality of states comprises a state indicative of whether the endpoint device allows dual homing.

16. The logic of claim 14, wherein the plurality of states comprises a state indicative of whether the endpoint device allows internet sharing.

17. The logic of claim 14, wherein the plurality of states comprises a state indicative of whether the endpoint device allows network file sharing.

18. The logic of claim 14, wherein the plurality of states comprises a state indicative of whether the endpoint device allows ad-hoc connections.

* * * * *